United States Patent [19]

Cicha et al.

[11] Patent Number: 6,054,107
[45] Date of Patent: Apr. 25, 2000

[54] PHOSGENE MANUFACTURING PROCESS

[75] Inventors: Walter Vladimir Cicha, Newark; Leo Ernest Manzer, Wilmington, both of Del.

[73] Assignee: E. I. du Pont de Nemours and Company, Wilmington, Del.

[21] Appl. No.: 09/202,578

[22] PCT Filed: Jun. 26, 1997

[86] PCT No.: PCT/US97/11296

§ 371 Date: Dec. 17, 1998

§ 102(e) Date: Dec. 17, 1998

[87] PCT Pub. No.: WO98/00364

PCT Pub. Date: Jan. 8, 1998

Related U.S. Application Data

[60] Provisional application No. 60/022,518, Jun. 28, 1996.

[51] Int. Cl.$^7$ .......................... C01B 31/00; C01B 31/28; C01B 31/36; B01J 27/224
[52] U.S. Cl. ...................... 423/414; 423/415.1; 423/416; 423/439; 423/440; 562/840; 562/847
[58] Field of Search .................... 502/178, 174, 502/177; 423/416, 440, 346, 324, 344, 345, 439, 414, 415.1; 562/840, 847

[56] References Cited

U.S. PATENT DOCUMENTS

| | | | |
|---|---|---|---|
| 4,231,959 | 11/1980 | Obrecht | 260/544 |
| 4,764,308 | 8/1988 | Sauer et al. | 260/544 |
| 4,914,070 | 4/1990 | Ledoux et al. | 502/178 |

FOREIGN PATENT DOCUMENTS

| | | | |
|---|---|---|---|
| 0 003 530 | 8/1979 | European Pat. Off. | C01B 31/28 |
| 0 313 480 | 10/1988 | European Pat. Off. | C01B 31/36 |
| 6-29129 | 4/1994 | Japan | C01B 31/28 |

OTHER PUBLICATIONS

Sato Kyoichi, Production of Phosgene, Abstract 63156040, Jan. 10, 1990.

Derwent Publications Ltd., Abstract JP 09 059 012A, Mar. 4, 1997.

Marc J. Ledoux et al., New Synthesis and Uses of High-Specific-Surface SiC as a Catalytic Support that is Chemically Inert and Has High Thermal Resistance, *Journal of Catalysis*, 114, 176–185, 1988.

*Primary Examiner*—Steven P. Griffin
*Assistant Examiner*—Eileen E. Nave

[57] ABSTRACT

A process for producing phosgene is disclosed which involves contacting a mixture comprising CO and $Cl_2$ (e.g, at about 300° C. or less) with a silicon carbide catalyst having a surface area of at least 10 $m^2.g^{-1}$.

4 Claims, No Drawings

PHOSGENE MANUFACTURING PROCESS

This application is a national filing under 35 USC 371 of International Application No. PCT/US97/11296 filed Jun. 26, 1997, now International Publication No. WO 98/00364, and claims priority benefit of U.S. Provisional Application No. 60/022,518 filed Jun. 28, 1996.

FIELD OF THE INVENTION

This invention relates to a process for the manufacture of phosgene by the reaction of chlorine ($Cl_2$) with carbon monoxide (CO) in the presence of a catalyst. More particularly, this invention relates to a process for the manufacture of phosgene with minimal production of the hazardous chemical, carbon tetrachloride.

BACKGROUND

The production of phosgene by the reaction of chlorine with carbon monoxide in the presence of a carbon catalyst is a well known process. The phosgene produced by this process will typically contain 400 to 500 ppm by weight carbon tetrachloride. This amount, needs to be evaluated on the basis of the total world-wide production of phosgene which is about ten billion pounds ($4.5 \times 10^9$ kg), corresponds to co-production of about 4 to 5 million pounds ($1.8 \times 10^6$ kg to $2.3 \times 10^6$ kg) of carbon tetrachloride with the phosgene.

A Japanese patent publication (Kokoku) Patent No. Hei 6[1994]-29129 discloses that the amount of carbon tetrachloride produced during the phosgene manufacturing process can be reduced by about 50% to about 150 ppm by weight by using an activated carbon which has been washed with an acid and which contains a total of 1.5 wt. % or less of metal components comprised of transition metals, boron, aluminum and silicon.

Carbon tetrachloride has been shown to have both significant ozone depletion and global warming potentials. Therefore, there is an interest in developing phosgene processes in which the amount of carbon tetrachloride impurity is minimized.

Silicon carbide has long been known as a material which has high thermal and chemical stability, has excellent heat and electrical conducting properties and as an abrasive which is almost as hard as diamond. Silicon carbide can be commercially prepared electrochemically using the Acheson process. The product so produced has a surface area of less than 1 $m^2/g$; its use as a catalyst support has been limited partly because of this low surface area. Recently, high surface area (60 to 400 $m^2/g$) silicon carbides have been prepared (M. J. Ledoux et al., J. Catal., 114, 176–185 (1988)). These high surface area materials are used as catalyst supports or carriers.

SUMMARY OF THE INVENTION

A process for producing phosgene is provided which comprises contacting a mixture comprising carbon monoxide and chlorine at a temperature of about 300° C. or less. with a catalyst comprising silicon carbide and having a surface area of at least 10 $m^2 \cdot g^{-1}$.

DETAILED DESCRIPTION

The present invention relates to improving the production of phosgene produced by contacting carbon monoxide and chlorine. Surprisingly, we have found that silicon carbide itself can be used as a catalyst for the manufacture of phosgene. The improvement can be employed in connection with the operating conditions used for any of the carbon-based processes previously used commercially or described in the art (e.g., those processes disclosed in U.S. Pat. Nos. 4.231,959 and 4,764,308 for the production of phosgene).

Phosgene is commercially manufactured by passing carbon monoxide and chlorine over activated carbon. The reaction is strongly exothermic and is usually done in multitubular reactors to more effectively control the reaction temperature. Carbon monoxide is added in at least a stoichiometric amount (often in stoichiometric excess) to minimize the free chlorine content of the product phosgene.

The reaction temperature and the silicon carbide are chosen to provide phosgene which contains about 300 ppm or less by weight of carbon tetrachloride. Preferably, the phosgene contains less than about 250 ppm or less by weight of carbon tetrachloride; most preferably, the phosgene contains less than about 100 ppm or less by weight of carbon tetrachloride.

Any silicon carbide-containing catalyst with a surface area greater than about 10 $m^2/g$ (e.g., about 20 $m^2/g$, or more) may be used in the process of this invention. However, silicon carbide compositions having surface areas greater than about 100 $m^2/g$, prepared by the methods disclosed in U.S. Pat. No. 4.914,070 (incorporated herein by reference) are especially preferred. A silicon content of at least about 5 weight % is preferred. More preferably the silicon content is at least about 10 weight %. Of note are embodiments where the catalyst is manufactured using a process which comprises contacting silicon monoxide with finely divided carbon (see e.g., U.S. Pat. No. 4,914,070). Use of a carbon which has an ash content of less than about 0.1 wt. % to produce the silicon carbide is preferred.

A preferred silicon carbide catalyst is prepared by a process comprising reacting vapors of silicon monoxide, SiO. on carbon by the steps of: (a) generating vapors of SiO in a first reaction zone by heating a mixture of $SiO_2$ and Si at a temperature of between 1100° C. and 1400° C., under a pressure of between 0.1 and 1.5 hPa; and (b) contacting in a second reaction zone at a temperature of between 1100° C. and 1400° C., the SiO vapors generated in said first reaction zone with finely divided reactive carbon with a specific surface area that is equal to or greater than 200 $m^2 \cdot g^{-1}$. Examples of suitable reactive carbons include graphite pellets obtained by powder agglomeration: and activated carbon such as powdered activated carbon obtained by crushing granules of activated carbon.

The silicon carbide surface area as determined by BET measurement is preferably greater than about 100 $m^2/g$ and more preferably greater than about 300 $m^2/g$.

It is known from dissociation equilibria that at 100° C., phosgene contains about 50 ppm chlorine; and that at 200° C., about 0.4%, at 300° C., about 5% and at 400° C. about 20% of the phosgene is dissociated into carbon monoxide and chlorine. Also, the higher the reaction temperature the more carbon tetrachloride is produced. Accordingly, the temperature of the reaction is generally about 300° C. or less (e.g., in the range of from 40° C. to 300° C.). Preferably, the temperature of the process is from about 50° C. to 200° C.; more preferably from about 50° C. to 150° C. The phosgene produced by the process of this invention typically contains about 300 ppm by weight or less of carbon tetrachloride, based upon phosgene (i.e., 300 parts by weight $CCl_4$ per million parts by weight $COCl_2$ or less) even at a temperature of 300° C. Preferably, the reaction temperature and the silicon carbide are chosen to provide phosgene which contains less than about 250 ppm by weight of carbon tetrachloride; and more preferably, are chosen to provide phosgene which contains less than 100 ppm by weight of carbon tetrachloride, based upon phosgene. Of note are embodiments where the reaction time and temperature are controlled to provide a carbon tetrachloride concentration of 100 ppm or less based upon the total product stream.

Without further elaboration, it is believed that one skilled in the art can, using the description herein, utilize the present invention to its fullest extent. The following preferred specific embodiments are, therefore, to be construed as merely illustrative, and does not constrain the remainder of the disclosure in any way whatsoever.

EXAMPLES

The following procedures were used in Example 1 and Comparative Example A for catalyst testing and for product analysis.

General Catalyst Testing Procedure

A ½" (1.27 mm) O.D.×15" (381 mm) Inconel® 600 nickel alloy tube containing a 100 mesh (0.015 mm) Monel® nickel alloy screen was used as the reactor. The reactor was charged with about 2.5 mL to about 8 mL of silicon carbide catalyst and heated to 300° C. This was the temperature used for all the examples.

A 1:1 molar ratio mixture of carbon monoxide and chlorine was passed over the catalyst. The contact times were between 0.9 to 12 seconds. The experimental results are shown in Tables 1 and A.

General Analytical Procedure

The reactor effluent was sampled on-line with a Hewlett Packard HP 5890 gas chromatograph using a 105 m long, 0.25 mm I.D. column containing Restak™ RTX-1 Crossbond 100% dimethyl polysiloxane. Gas chromatographic conditions were 50° C. for 10 minutes followed by temperature programming to 200° C. at a rate of 15° C./minute. The smallest amount of carbon tetrachloride that could be quantitatively identified was about 40 ppm by weight for Example 1 and about 80 ppm by weight for Comparative Example A. Testing results are shown in Tables 1 and A.

TABLE 1

| Example | $CCl_4$ Conc.[1] ppm | $COCl_2$[2] mole % | Si Content wt. % | Surface Area $m^2/g$ |
|---------|----------------------|--------------------|-----------------|-----------------------|
| 1 | 50 | >77 | 29.0 | 480 |

[1]By weight as ppm of the product stream. The value shown is an average taken over 7 hours and is a high-end estimate
[2]Fraction in product gas stream over initial 7 hours of the run. The contact time was 0.9 to 1.3 seconds

TABLE A

| Comparative Example | $CCl_4$ Conc.[1] ppm | $COCl_2$[2] mole % | Si Content wt. % | Surface Area $m^2/g$ |
|---------------------|----------------------|--------------------|-----------------|-----------------------|
| A | <80 | 4.0 | 70.0[3] | 0.062 |

[1]By weight as ppm of the product stream. The value shown is an average taken over 7 hours and is a high-end estimate
[2]Fraction in product gas stream over initial 7 hours of the run. The contact time was 8 to 12 seconds
[3]Calculated based on stoichiometry

What is claimed is:

1. A process for producing phosgene, comprising:
   contacting a mixture comprising CO and $Cl_2$ at a temperature of about 300° C., or less, with a catalyst comprising silicon carbide and having a surface area of at least 10 $m^2 \cdot g^{-1}$.

2. The process of claim 1 wherein the catalyst is manufactured using a process which comprises contacting silicon monoxide with finely divided carbon.

3. The process of claim 2 wherein the carbon used to produce the silicon carbide has an ash content of less than about 0.1 wt %.

4. The process of claim 1 where the silicon carbide is obtained by (a) generating vapors of SiO in a first reaction zone by heating a mixture of $SiO_2$ and Si at a temperature of between 1100° C. and 1400° C., under a pressure of between 0.1 and 1.5 hPa; and (b) contacting in a second reaction zone at a temperature of between 1100° C. and 1400° C., the SiO vapors generated in said first reaction zone with finely divided reactive carbon with a specific surface area that is equal to or greater than 200 $m^2 \cdot g^{-1}$.

* * * * *